United States Patent
Sieber

[15] 3,665,207
[45] May 23, 1972

[54] PULSE GENERATOR

[72] Inventor: Paul Sieber, Lortzingstrasse 20, 71 Heilbronn-Bockinger, Germany

[22] Filed: Aug. 25, 1970

[21] Appl. No.: 66,782

[30] Foreign Application Priority Data

Sept. 3, 1969 Germany................P 19 44 691.4

[52] U.S. Cl. ..........................307/106, 340/81 R, 340/331
[51] Int. Cl..............................................................B60q 1/26
[58] Field of Search ..................340/81, 366, 331; 307/202, 307/106; 328/9, 10

[56] References Cited

UNITED STATES PATENTS

| | | | |
|---|---|---|---|
| 3,329,868 | 7/1967 | Domann et al. | 340/81 |
| 3,263,119 | 7/1966 | Scholl | 340/81 X |
| 3,002,127 | 9/1961 | Grontkowski | 340/81 X |
| 3,428,943 | 2/1969 | Carp et al. | 340/81 X |
| 3,452,248 | 6/1969 | Leeder | 340/81 |
| 3,510,315 | 3/1970 | Shimeda | 340/81 X |
| 3,553,528 | 1/1971 | Somlyody | 340/81 X |

Primary Examiner—H. O. Jones
Assistant Examiner—William J. Smith
Attorney—Spencer & Kaye

[57] ABSTRACT

A pulse generator comprises a trigger stage for periodically interrupting the operation of a plurality of parallel loads. Connected to a voltage supply, are a capacitor and a precision resistor connected between the loads and the supply, a switching unit receiving voltage peaks which appear at the precision resistor on an interruption of operation, the switching unit being responsive to the voltage peaks and retaining its switching state caused by a voltage peak at least until it receives a voltage peak of another value and means for variation of the frequency of interruptions in response to a switching state of the switching unit caused by a voltage peak of a value indicative of a field load.

13 Claims, 2 Drawing Figures

Inventor:
Paul Sieber

PULSE GENERATOR

BACKGROUND OF THE INVENTION

The present invention relates to a pulse generator composed of a trigger stage for the periodically interrupted operation of a plurality of loads connected in parallel, particularly incandescent lamps.

In recent times, multiple transistorized circuits have been proposed for blinker systems in motor vehicles, which have the advantage of lower susceptability to breakdown and time-constant light and dark phases in comparison with the conventional relay blinker systems. It is the object of the present invention to provide a particularly advantageous circuit for a pulse generator which can be used preferably as a battery-driven blinker unit or as a warning blinker system in vehicles of all kinds.

In the copending Patent application of Rudolf Gebhart and Paul Sieber, Ser. No. 85,038 filed on Oct. 29, 1970, and assigned to the assignee of the present application, it has already been proposed to provide a resistor which is so connected, between the load and the source of supply voltage, in the intervals between operation, that during the intervals, a constant measuring current flows through the loads and produces a voltage drop at the loads. This voltage drop is supplied to a switch which is so dimensioned that, during the intervals, in the event of failure of one or more loads, the switch changes its switching state in comparison with that with intact loads, as a result of the altered potential appearing at the switch in comparison with normal operation with intact loads.

Thus this pulse generator which has already been proposed comprises a control unit which indicates whether the connected loads are intact or whether one or more loads have failed and have to be replaced. It has further been previously proposed that a voltage divider, which is so dimensioned that the charging voltage is reduced with intact loads, should be connected to the capacitor determining the intervals and operating times, by means of the switch of the control unit in the event of loads having failed.

SUMMARY OF THE INVENTION

It is an object of the present invention to provide an improvement in the circuit for a pulse generator disclosed in the above-mentioned co-pending patent application.

According to the present invention there is provided, a pulse generator comprising a trigger stage for periodically interrupting the operation of a plurality of loads connected in parallel. The trigger stage includes a capacitor and a precision resistor connected between said plurality of loads and a source of supply voltage for operating said plurality of loads. A switching unit responsive to short voltage peaks and retaining the state caused by said voltage peaks at least until it receives a voltage peak of a different value is provided with, means for connecting said switching unit to said precision resistor for applying the voltage peaks which appear at said precision resistor on interruption of the operation of said loads to said switching unit and means responsive to a state of said switching and caused by a voltage peak indicative of a load failure for varying the rate of interruption of the operation of said loads thus providing an induction of load failure.

BRIEF DESCRIPTION OF THE DRAWINGS

The invention will now be described in greater detail by way of example with reference to the accompanying drawings, in which.

DESCRIPTION OF THE PREFERRED EMBODIMENT

Basically in the circuit according to the invention, provision is made for the series connection of a capacitor and a precision resistor to be connected between the loads and the source of supply voltage during the intervals in operation, so that the voltage peaks appearing at the precision resistor when the load is switched off is applied to the control electrode of a switching unit. The switching unit responds to short voltage peaks and retains the switching state which it assumed after the appearance of a voltage peak on disconnection, at least until a variation in potential at one of its input electrodes is reached. The switching unit is so dimensioned and connected that, in the event of a reduced voltage peak on disconnection, caused by failing loads, it assumes a switching state whereby a voltage divider is connected to a second capacitor of the trigger stage, which determines the intervals in operation and the operating times, in such a manner that the charging voltage of the second capacitor is reduced in comparison with its charging voltage for intact loads to an extent depending upon the voltage divider ratio, so that the pulse repetition frequency of the generator is increased accordingly.

In the switching unit according to the invention, therefore, the control unit is controlled dynamically with short time duration voltage peaks. This has the advantage that a measuring current only flows through the load for an extremely short time duration during the intervals in operation. In this manner, the source of supply voltage is substantially not loaded by the additional power consumption of the control circuit. Furthermore, an additional increase in temperature is avoided in the housing in which the blinker unit is accommodated.

In the circuit according to the invention, the switching unit preferably consists of a thyristor, the control electrode of which is connected to the precision resistor. Instead of a thyristor, however, a bistable trigger stage or another circuit storing information may be used.

A thyristor is a four-layer semiconductor component with three p-n junctions, the main electrodes generally being connected to the outer regions while one of the middle regions is provided with a control electrode. In the circuit according to the invention, a main electrode of the thyristor is preferably connected to the center tap of a voltage divider which is connected to the source of supply voltage through the collector-emitter space of a turn-on transistor. The thyristor is so dimensioned that the bias voltage delivered by the voltage divider to the main electrode of the thyristor, when the turn-on transistor is conducting, reliably ensures turning-on of the thyristor on the arrival of a disconnection voltage peak. The magnitude of the disconnection voltage peak is determined by the total of the intact loads, while turning on does not take place in the event of a reduced voltage peak on disconnection caused by failed loads.

Figure 1:
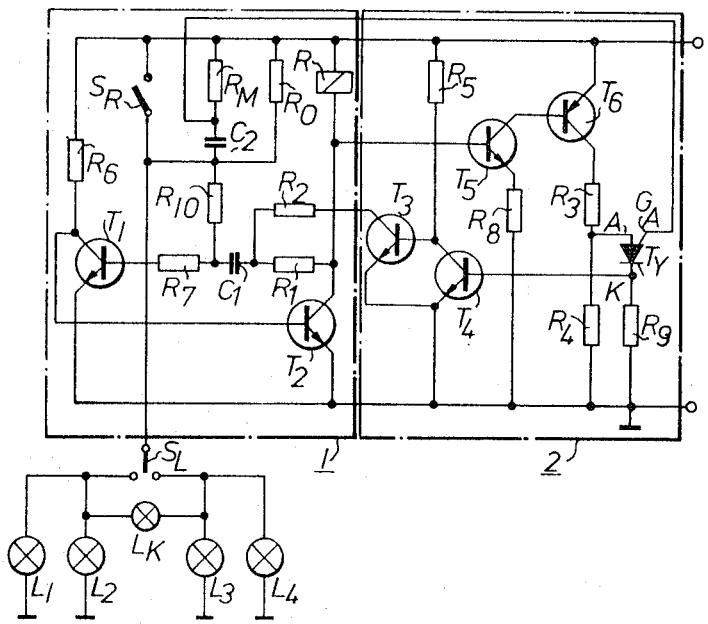
FIG. 1 is a circuit diagram of a pulse generator in accordance with the invention.

Referring now to FIG. 1, the circuit shown consists of two parts, the trigger stage 1 and the indicating or control section 2. The two sections of the circuit are distinguished by broken lines.

The trigger stage consists of two transistors $T_1$ and $T_2$, for example, n-p-n planar transistors. The emitter electrodes of these transistors are at ground potential, while the collector of the transistor $T_1$ is connected to the positive pole (for example 12 volts) of the source supply voltage through the collector resistor $R_6$, and the collector of the transistor $T_2$ is connected thereto through a relay winding R. Furthermore, the collector of the transistor $T_1$ is connected directly to the base of the transistor $T_2$ while the base series resistor $R_7$, the capacitor $C_1$ and the resistor $R_1$ are connected in series between the base of the transistor $T_1$ and the collector of the transistor $T_2$. Connected to the junction between the resistor $R_7$ and the capacitor $C_1$ is a series connection of the resistor $R_{10}$, the capacitor $C_2$ and the precision resistor $R_M$, which is connected to the positive pole of the source of supply voltage. The series connection of capacitor $C_2$ and precision resistor $R_M$ is bridged by a switch $S_R$ which is actuated by the relay R and which in turn is bridged by a resistor $R_o$ having a high resistance. The control section consists of a thyristor $T_y$, the control electrode $G_A$ of which is connected to the mid-connection between the capacitor $C_2$ and the precision resistor $R_M$. The cathode K of the thyristor $T_ν$ is connected through a resistor $R_9$, to the ground electrode, while the anode A is connected to the mid-connection of a voltage divider consisting of the resistors $R_3$ and $R_4$. With the collector-emitter path of a turn-on transistor $T_6$, the voltage divider forms a series connection which is connected between the poles of the source of supply voltage. The transistor $T_6$ is a transistor which is complementary to all the other transistors and its base electrode is connected to the collector electrode of the series transistor $T_5$. The emitter electrode of the transistor $T_5$ is connected to the ground electrode through an emitter resistor $R_8$. The series transistor $T_5$ derives its base control potential from the collector electrode of the transistor $T_2$ of the trigger stage. The base electrode of a switching transistor $T_4$, the emitter electrode of which is preferably at ground potential, is connected to the collector or cathode electrode K of the thyristor $T_ν$. In this manner, the voltage drop at the resistor $R_9$ is the control voltage for the transistor $T_4$. The collector electrode of the transistor $T_4$ is connected, through a collector resistor $R_5$, to the positive pole of the source of supply voltage, and is at the same time connected to the base electrode of a series transistor $T_3$, the emitter electrode of which is likewise at earth potential. The collector electrode of the transistor $T_3$ is connected to a resistor $R_2$ which, together with the resistor $R_1$ of the trigger stage to which it is connected, forms a voltage divider. The switch $S_R$ can be connected to the loads through a further switch $S_L$. In FIG. 1, two loads $L_1$, $L_2$ and $L_3$, $L_4$ connected in parallel are illustrated as is usual in motor vehicles. The two possible switching-positions of the switch $S_L$ are bridged by an indicator lamp $L_K$.

The circuit illustrated and described works as follows:

When the switch $S_L$ is in the mid position, that is to say when no load is connected to the pulse generator, a base current flows across the resistors $R_o$, $R_{10}$ and $R_7$ to the transistor $T_1$. As a result, the transistor $T_1$ becomes conducting and its collector potential drops to the collector saturation voltage which is lower than the base forward voltage of the transistor $T_2$. The transistor $T_2$ remains cut off. The capacitor $C_2$ is charged to the value of the supply voltage. When loads are connected up to the trigger stage 1 through the switch $S_L$, the potential at the junction between the capacitor $C_2$ and the resistor $R_{10}$ drops almost to ground potential because $R_o$ has a high resistance in comparison with the internal resistance of the load. Thus the potential at the transistor $T_1$ also drops to such an extent that this changes over into the cut-off stage. As a result, the collector potential rises sharply at $T_1$ and changes the transistor $T_2$ connected thereto over into the conducting state. Thus a powerful current flows over the collector-emitter path of $T_2$ through the relay winding R and closes the switch $S_R$. After the closing of $S_R$, the loads are connected directly between the poles of the source of supply voltage. If the loads are incandescent lamps, they will be illuminated. As a result of the dimensioning of the resistor $R_O$, which bridges the switch $S_R$, the effect is achieved that after the closing of the switch $S_L$, the illumination phase of the connected load begins.

Since the transistor $T_2$ is conducting, the potential at the plate of the capacitor $C_1$ connected to the resistor $R_1$ drops to the residual voltage of the transistor $T_2$. Since the voltage cannot jump at the capacitor $C_1$, however, the other plate of the capacitor $C_1$ assumes the negative value of the charging voltage and holds the transistor $T_1$ cut off. The capacitor is then charged, with the time constant $τ_1 ≈ C \cdot R_{10}$, from this negative voltage through the discharged state to positive voltage values. At a specific positive voltage, for example at 0.7 volts, the transistor $T_1$ again becomes conducting and the transistor $T_2$ cut off, the relay releases and the illumination phase is at an end. During the following dark phase, a charge-exchange current flows across the capacitor $C_1$ to the base of the transistor $T_1$ and maintains the conducting state of the transistor $T_1$ until the charge-exchange current has decreased to a value at which the transistor $T_1$ is again cut off and the next illumination phase is introduced. When the transistor $T_1$ becomes conducting at the beginning of the dark phase, the capacitor current of the capacitor $C_1$ jumps to the value $I_{max} ≈ U_o/R_1 + R_7$, in which $U_o$ is the supply voltage. This current decreases to the value zero with the time constant $τ_2 ≈ (R_1 + R_7) C_1$.

Figure 2:
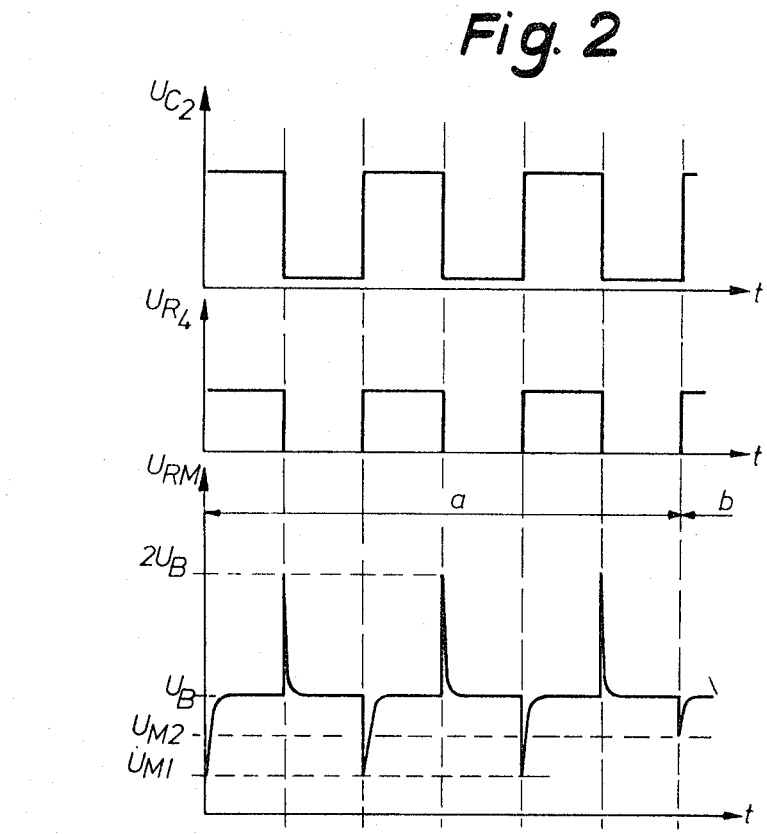
FIG. 2 is a diagram showing voltage behavior of various parts of the circuit of FIG. 1.

In FIG. 2, the pulse pattern of the collector current at the transistor $T_2$ is illustrated in the upper most diagram. The potential at the collector electrode of the transistor $T_2$ also determines whether a threshold voltage permitting turning on is present at the thyristor T of the control circuit 2 or not, while the control voltage for the thyristor $T_ν$ is derived from the junction between the capacitor $C_2$ and the precision resistor $R_M$. Since the relay has a certain, mechanically determined response time, the signal supplied by the collector electrode of the transistor $T_2$ is always available before the control signal arrives at the thyristor. In this manner, the effects of chattering of the switch are eliminated and assurance is always provided that the response threshold at the thyristor $T_ν$ is set before the useful signal arrives at the control input $G_A$. When the relay contact $S_R$ is opened, a voltage peak, which is proportional to the resistance of the incandescent lamps and dies away with the time constant $C_2 \cdot (R_L + R_M)$, develops at the precision resistor $R_M$. When the contact $S_R$ is closed, the capacitor $C_2$ is discharged across the precision resistor $R_M$ and the voltage at the capacitor $C_2$ is added to the supply voltage $U_o$. This voltage behavior at the precision resistor $R_M$ is illustrated in the bottom diagram in FIG. 2. The section $a$ shows the voltage behavior when both loads connected in parallel are intact. If one load fails, the load resistance increases by the factor 2 and there is a considerably lower voltage peak on disconnection, as illustration in section $b$ of the diagram. Calculation shows that the maximum difference between the voltage peaks $U_{M1}$ and $U_{M2}$ is obtained when the precision resistor has the value $R_M = R_L/\sqrt{2}$, in which $R_L$ is the total resistance of two loads connected in parallel.

When positive potential is applied to the collector electrode of the transistor $T_2$, that is to say when the transistor $T_2$ is cut off at the beginning of the dark phase the transistor $T_5$ becomes conducting through the positive base potential. Thus $T_5$ carries a collector current which, at the same time, is the base current of the complementary transistor $T_6$ which is thus likewise conducting.

Thus the voltage divider consisting of the resistors $R_3$ and $R_4$ is connected between the poles of the source of supply voltage. This voltage divider is so dimensioned that the potential taken off therefrom and applied to the anode A of the thyristor $T_ν$ is reliably sufficient, as a threshold voltage, when the voltage pulse arriving at the control electrode $G_A$ has its maximum value which is determined by all the intact loads to fire the thyristor $T_ν$. On the other hand, if the voltage pulse on disconnection is reduced as a result of failed loads, this reduced disconnection pulse is no longer sufficient for the firing of the thyristor. Starting with intact loads, therefore, during the dark phase of the pulse circuit, a threshold voltage is applied to the thyristor as illustrated in the center diagram in FIG. 2. In addition, a disconnection pulse, which is sufficient for the firing, appears at the control electrode $G_A$ of the thyristor at the begin-ning of the dark phase. As a result, a current which causes a voltage drop at the resistor $R_9$ flows across the thyristor $T_ν$ and the resistor $R_9$. This voltage drop controls the transistor $T_4$ so as to bring it into the conducting state and the transistor $T_3$ so as to bring it into the cut off state. Since $T_3$ remains cut off during the dark phase with intact loads, the resistor $R_2$ is ineffective.

At the beginning of the illuminated phase, the transistor $T_2$ becomes conducting and the potential at the collector electrode of the transistor $T_2$ drops to a value at which the two transistors $T_5$ and $T_6$ are cut off. Thus the voltage divider consisting of the resistors $R_3$ and $R_4$ is disconnected from the supply voltage and the thyristor $T_ν$ is turned off.

If only small voltage pulses on disconnection, caused by one or more failed loads, arrive at the control electrode $G_a$ of the thyristor $T_ν$, the thyristor is no longer turned on in the dark phases, substantially ground potential then prevails at the base electrode of the transistor $T_4$ so that this transistor remains cut off and the transistor $T_3$ is consequently opened. As a result, the resistor $R_2$ is connected to ground through the collector-emitter space of the transistor $T_3$. In this case, the capacitor $C_1$ is only charged, at most, to the voltage $U \sim U_o R_2/R_1 + R_2$. The maximum capacitor charge-exchange current appearing in the dark phases drops, with the time constant $$\tau \left( R_7 + \frac{R_1 \cdot R_2}{R_1 + R_2} \right) C_1$$

to the value zero from the maximum value $$I_{max} \sim \frac{R_7 \cdot U_o}{R_1 R_2 + R_2 R_7 + R_1 R_7}.$$

Thus the pulse repetition frequency of the pulse generator increases. If the voltage divider $R_1$, $R_2$ is so dimensioned that the maximum charge-exchange current and the maximum charging voltage of the capacitor $C_1$ are reduced by half in comparison with operation with intact loads, the pulse repetition frequency of the generator is doubled in consequence. The indicator lamp $L_K$, which connects the switch contacts of the switch $S_1$ to one another will thus go on and off at twice as fast a rate on the failure of one load; a striking and unerring sign of the failure of a load. The pulse frequency of the generator can naturally be varied in any other manner on the failure of loads, by appropriate dimensioning of the voltage divider $R_1$, $R_2$.

Apart from the capacitors and the incandescent lamps, all the components of the trigger stage and of the control circuit can be realized in the form of an integrated circuit by the thick-film, thin-film or integrated solid-state technique, on a semiconductor base. The pulse generator according to the invention can, of course, also be realized with the complementary transistors to FIG. 1 if the polarity of the source of supply voltage is also altered accordingly. In order to operate the blinker circuit as a warning blinker system, all four loads are connected in parallel. Other loads may be used instead of lamps for other purposes.

It will be understood that the above description of the present invention is susceptible to various modifications changes and adaptations.

What is claimed is:

1. A pulse generator comprising a voltage supply, a trigger stage for periodically interrupted operation of a plurality of loads connected in parallel, a capacitor and a precision resistor connected in series between said plurality of loads and said voltage supply during the operating pauses of said plurality of loads, a switching unit responsive to short voltage peaks and retaining the state caused by said voltage peaks at least until said switching unit receives a voltage which is different than a threshold voltage value, means for connecting said switching unit to said precision resistor for applying said voltage peaks which appear at said precision resistor on interruption of the operation of said loads to said switching unit, means for applying said threshold voltage to said switching unit, and means responsive to a state of said switching unit caused by a voltage peak indicative of a load failure for varying the rate of interruption of the operation of said loads thus providing an indication of load failure.

2. A pulse generator comprising a voltage supply, a trigger stage for periodically interrupted operation of a plurality of loads connected in parallel, a first capacitor for controlling the frequency of the interrupted operation of said loads, a second capacitor and a precision resistor connected in series between said plurality of loads and said voltage supply during the operating pauses of said plurality of loads, a switching unit including an input electrode and a control electrode, said switching unit being responsive to short voltage peaks applied to said control electrode and retaining the state caused by said voltage peaks at least until said input electrode receives a voltage which is different than a threshold voltage value, means for connecting said control electrode of said switching unit to said precision resistor for applying said voltage peaks which appear at said precision resistor on interruption of the operation of said loads to said control electrode, means for applying said threshold voltage to said input electrode, a voltage divider, and means responsive to a state of said switching unit caused by a voltage peak indicative of a load failure for connecting said voltage divider to said first capacitor for reducing the charging voltage of said first capacitor depending on the ratio of said voltage divider to increase said frequency of said interruptions.

3. A pulse generator defined in claim 2, wherein said precision resistor has a value substantially equal to the total resistance of two loads in parallel divided by the sqaure root of two.

4. A pulse generator defined in claim 2, wherein said switching unit comprises a thyristor, the control electrode of which is connected by said connecting means to said precision resistor.

5. A pulse generator as defined in claim 4, wherein said thyristor further includes two main electrodes, and wherein said generator further comprises a second voltage divider connected to said voltage supply, a tap on said second voltage divider connected to one of said two main electrodes of said thyristor, a first transistor acting to turn on said thyristor and having a collector-emitter path through which said second voltage divider is connected to said voltage, supply, said second voltage divider supplying a bias voltage to said thyristor which ensures, when said first transistor is conducting, that said thyristor fires on receipt of a voltage peak through said connecting means on interruption of the operation of said loads when said loads are intact, and that said thyristor remains uneffected by the receipt of a voltage peak on interruption of the operation of said loads when a failure exits in said loads.

6. A pulse generator as defined in claim 5, further comprising a second transistor whose collector is connected to the base electrode of said first transistor and a third transistor in said trigger stage, whose collector is connected to the base electrode of said second transistor.

7. A pulse generator as defined in claim 6, further comprising a second resistance connected between the other main electrode of said thyristor and the ground side of voltage supply, a fourth transistor which is conducting when said thyristor is conducting and to the base of which the voltage drop across said second resistance is applied, a fifth transistor which is cut off when said fourth transistor is conducting and to the base of which one resistance of said first voltage divider is connected so as to be connected to the ground side of said voltage supply through said fifth transistor when conducting.

8. A pulse generator as defined in claim 7, wherein said first transistor is a p-n-p transistor and said second, third, fourth and fifth transistors are n-p-n transistors.

9. A pulse generator as defined in claim 7, wherein the circuit of said pulse generator is an integrated solid state circuit.

10. A pulse generator as defined in claim 7, wherein the circuit of said pulse generator is a thick film circuit.

11. A pulse generator as defined in claim 7, wherein the circuit of said pulse generator is a thin film circuit.

12. A pulse generator as defined in claim 6, further comprising a relay winding connected to the collector path of said third transistor for energization when said first of said plurality of transistors is inducting, and a pair of make contacts operated by said relay winding an bridging said first capacitor and its associated resistance for connecting said loads directly to said voltage supply when the contacts are made.

13. A pulse generator as defined in claim 12, further comprising a third resistance of high value bridging said make contacts.

* * * * *